US012597769B2

(12) United States Patent
Chen et al.

(10) Patent No.: US 12,597,769 B2
(45) Date of Patent: Apr. 7, 2026

(54) ELECTROSTATIC DISCHARGE PROTECTION DEVICE

(71) Applicant: VIA TECHNOLOGIES, INC., New Taipei City (TW)

(72) Inventors: Ke-Yuan Chen, New Taipei City (TW); Tzu-Chun Liu, New Taipei City (TW)

(73) Assignee: VIA TECHNOLOGIES, INC., New Taipei City (TW)

( * ) Notice: Subject to any disclaimer, the term of this patent is extended or adjusted under 35 U.S.C. 154(b) by 392 days.

(21) Appl. No.: 18/296,541

(22) Filed: Apr. 6, 2023

(65) Prior Publication Data

US 2024/0222959 A1 Jul. 4, 2024

(30) Foreign Application Priority Data

Jan. 4, 2023 (TW) ................................. 112100212

(51) Int. Cl.
 *H02H 9/00* (2006.01)
 *H02H 9/04* (2006.01)
(52) U.S. Cl.
 CPC .............. *H02H 9/005* (2013.01); *H02H 9/04* (2013.01)
(58) Field of Classification Search
 CPC ......... H10D 89/713; H02H 9/005; H02H 9/04
 See application file for complete search history.

(56) References Cited

U.S. PATENT DOCUMENTS

| | | | | |
|---|---|---|---|---|
| 2014/0197450 A1* | 7/2014 | He | ......................... | H10D 84/83 |
| | | | | 257/659 |
| 2014/0291765 A1* | 10/2014 | Ouyang | ............... | H10D 89/815 |
| | | | | 257/355 |
| 2023/0040542 A1* | 2/2023 | Xu | ........................ | H10D 89/611 |

* cited by examiner

*Primary Examiner* — Steven B Gauthier
*Assistant Examiner* — Marc-Anthony Armand
(74) *Attorney, Agent, or Firm* — McClure, Qualey & Rodack, LLP

(57) ABSTRACT

An electrostatic discharge protection device is provided. The electrostatic discharge protection device includes first and second N-type and P-type and third P-type doped regions in the first and second N-type well regions in a P-type semiconductor substrate. First and second P-type well regions are in the first N-type well region. Third N-type, fourth P-type and N-type and fifth P-type doped regions are in the first and second P-type well regions. Fifth N-type and sixth P-type doped regions are in the third P-type well region in the second N-type well region. The first and second N-type doped regions are directly electrically connected to the fifth and sixth P-type doped regions, respectively. The first P-type and fifth N-type, the second P-type and third N-type, and the third P-type doped region and the fourth N-type and P-type doped regions are electrically connected to input/output, power supply and ground terminals.

20 Claims, 7 Drawing Sheets

ELECTROSTATIC DISCHARGE PROTECTION DEVICE

CROSS REFERENCE TO RELATED APPLICATIONS

This application claims priority of Taiwan Patent Application No. 112100212, filed on Jan. 4, 2023, the entirety of which is incorporated by reference herein.

BACKGROUND OF THE INVENTION

Field of the Invention

The present disclosure relates to an electrostatic discharge protection device, and, in particular, to the structure and layout of an electrostatic discharge protection device.

Description of the Related Art

Integrated circuits (ICs) include semiconductor devices that are susceptible to damage from electrical overstress (EOS) conditions which include electrostatic discharge (ESD), transient conditions, latch-up, and incorrect polarity connections. The EOS conditions are characterized by over-voltage and over-current stress events. Electrostatic charge (ESC) would accumulate in IC package, manufacturing machine or operator and it would damage semiconductor devices and circuitry therein if the IC is stressed by the charge. This phenomenon is called electrostatic discharge. Therefore, how to protect semiconductor devices from ESD and other electrical overvoltage conditions is a problem that needs to be solved. In addition, for high-speed and high-end chips, a conventional ESD protection circuit using diodes or transistors cannot solve the ESD problem.

BRIEF SUMMARY OF THE INVENTION

An embodiment of the disclosure provides an electrostatic discharge protection device. The electrostatic discharge protection device includes a P-type semiconductor substrate, a first N-type well region, a second N-type well region, a first N-type doped region, a first P-type doped region, a second N-type doped region, a second P-type doped region, a third N-type doped region, a third P-type doped region, a fourth N-type doped region, a fourth P-type doped region, a fifth N-type doped region, a fifth P-type doped region, a sixth P-type doping region, a first P-type well region and a second P-type well region. The first N-type well region is located in the P-type semiconductor substrate. The first N-type doped region is located in the first N-type well region. The first P-type doped region is located in the first N-type well region. The first P-type doped region and the first N-type doped region are arranged side-by-side and spaced apart from each other. The second N-type well region is located in the P-type semiconductor substrate. The first N-type well region and the second N-type well region are arranged side-by-side and spaced apart from each other. The second N-type doped region is located in the second N-type well region. The second P-type doped region is located in the second N-type well region. The third P-type doped region is located in the second N-type well region. The second N-type doped region, the second P-type doped region and the third P-type doped region are arranged side-by-side and spaced apart from one another. The first P-type well region is located in the first N-type well region. The third N-type doped region is located in the first P-type well region. The fourth P-type well region is located in the first P-type well region. The third N-type doped region and the fourth P-type doped region are arranged side-by-side and spaced apart from each other. The second P-type well region is located in the first N-type well region. The first P-type well region and the second P-type well region are arranged side-by-side and spaced apart from each other. The fourth N-type doped region is located in the second P-type well region. The fifth P-type doped region is located in the second P-type well region. The fourth N-type doped region and the fifth P-type doped region are arranged side-by-side and spaced apart from each other. The third P-type well region is located in the second N-type well region. The fifth N-type doped region is located in the third P-type well region. The sixth P-type doped region is located in the third P-type well region. The fifth N-type doped region and the sixth P-type doped region are arranged side-by-side and spaced apart from each other. The first N-type doped region is directly electrically connected to the fifth P-type doped region. The second N-type doped region is directly electrically connected to the sixth P-type doped region. The first P-type doped region and the fifth N-type doped region are electrically connected to an input/output terminal. The second P-type doped region and the third N-type doped region are electrically connected to a power supply terminal. The third P-type doped region, the fourth N-type doped region and the fourth P-type doped region are electrically connected to a ground terminal.

BRIEF DESCRIPTION OF THE DRAWINGS

The present invention can be more fully understood by reading the subsequent detailed description and examples with references made to the accompanying drawings, wherein.

Figure 2A:
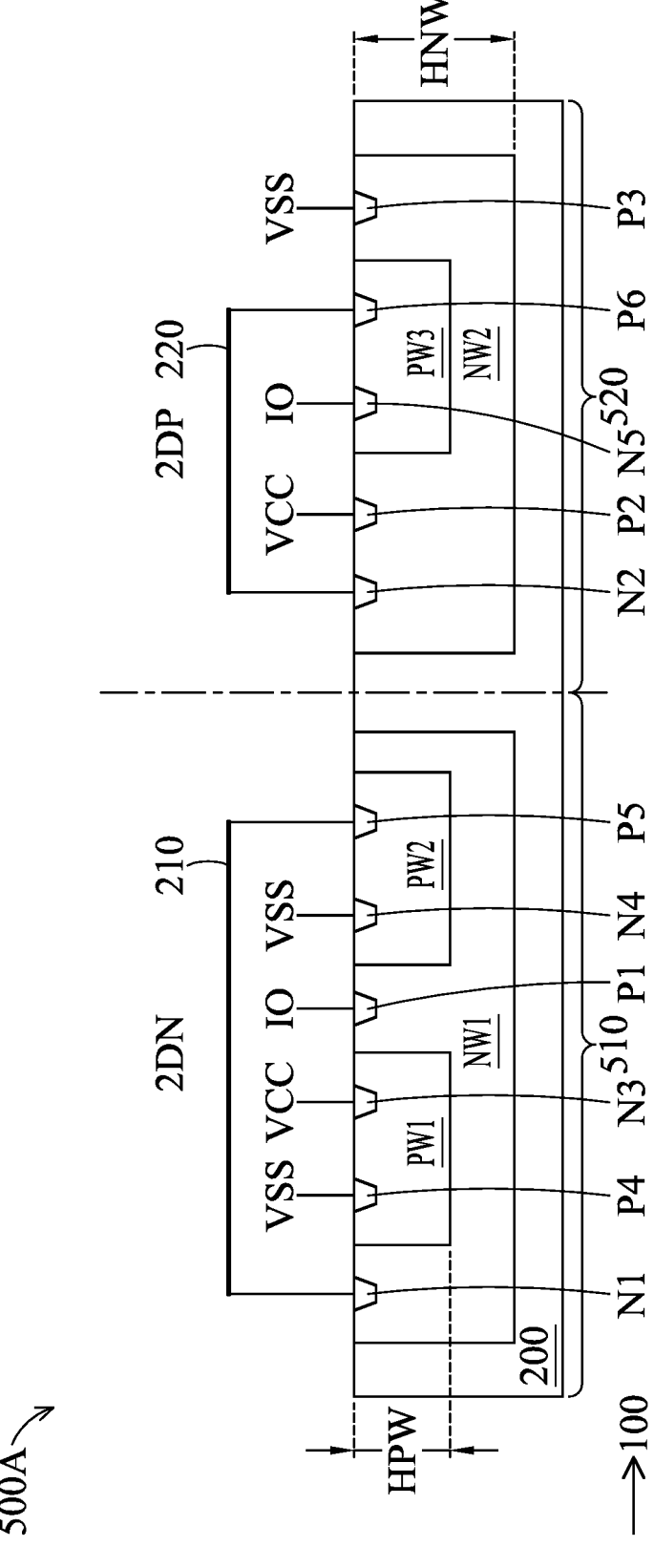
FIG. 2A is a schematic cross-sectional view along the line A-A' of the electrostatic discharge protection device of FIG. 1 in accordance with some embodiments of the disclosure.
Figure 6B:
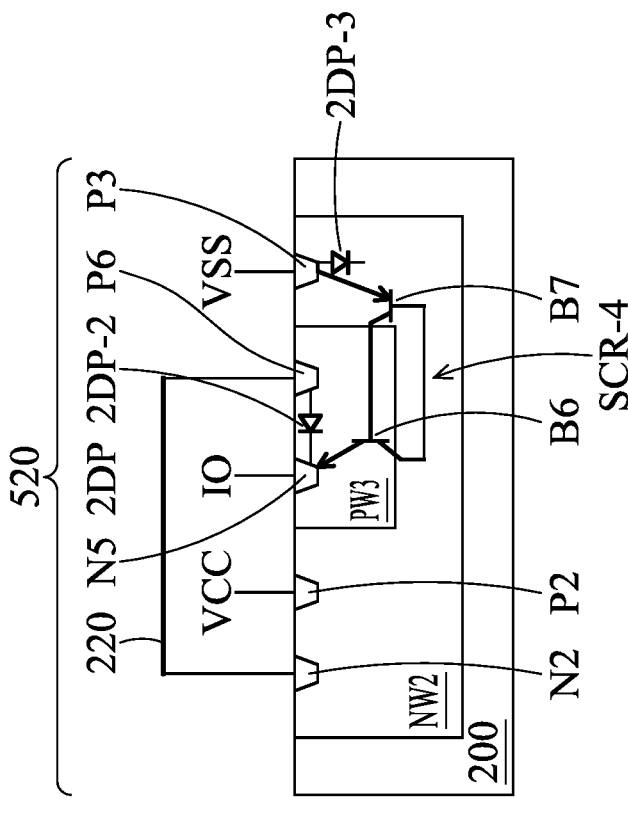
Figure 6A:
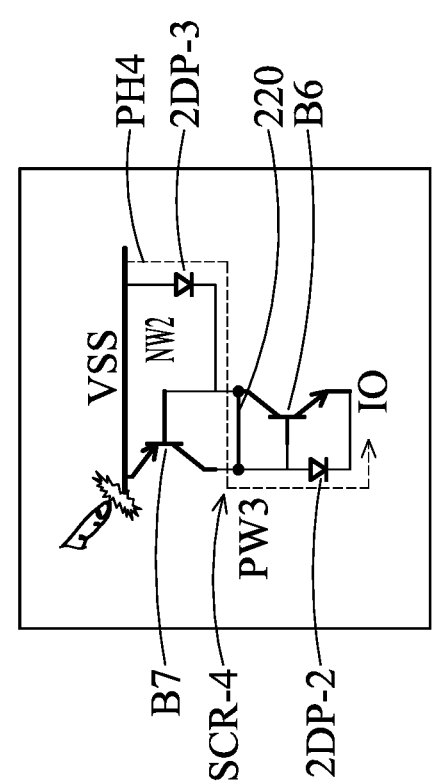

5A at the corresponding positions of the electrostatic discharge protection device of FIG. 2A;

FIG. 6A is an equivalent discharge circuit diagram of the electrostatic discharge protection device when an electrostatic discharge event occurs between the ground terminal (VSS) and the input/output terminal (IO); and FIG. 6B is a partial enlarged view of FIG. 2A showing the parasitic elements of the equivalent discharge circuit of FIG. 6A at the corresponding positions of the electrostatic discharge protection device of FIG. 2A.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
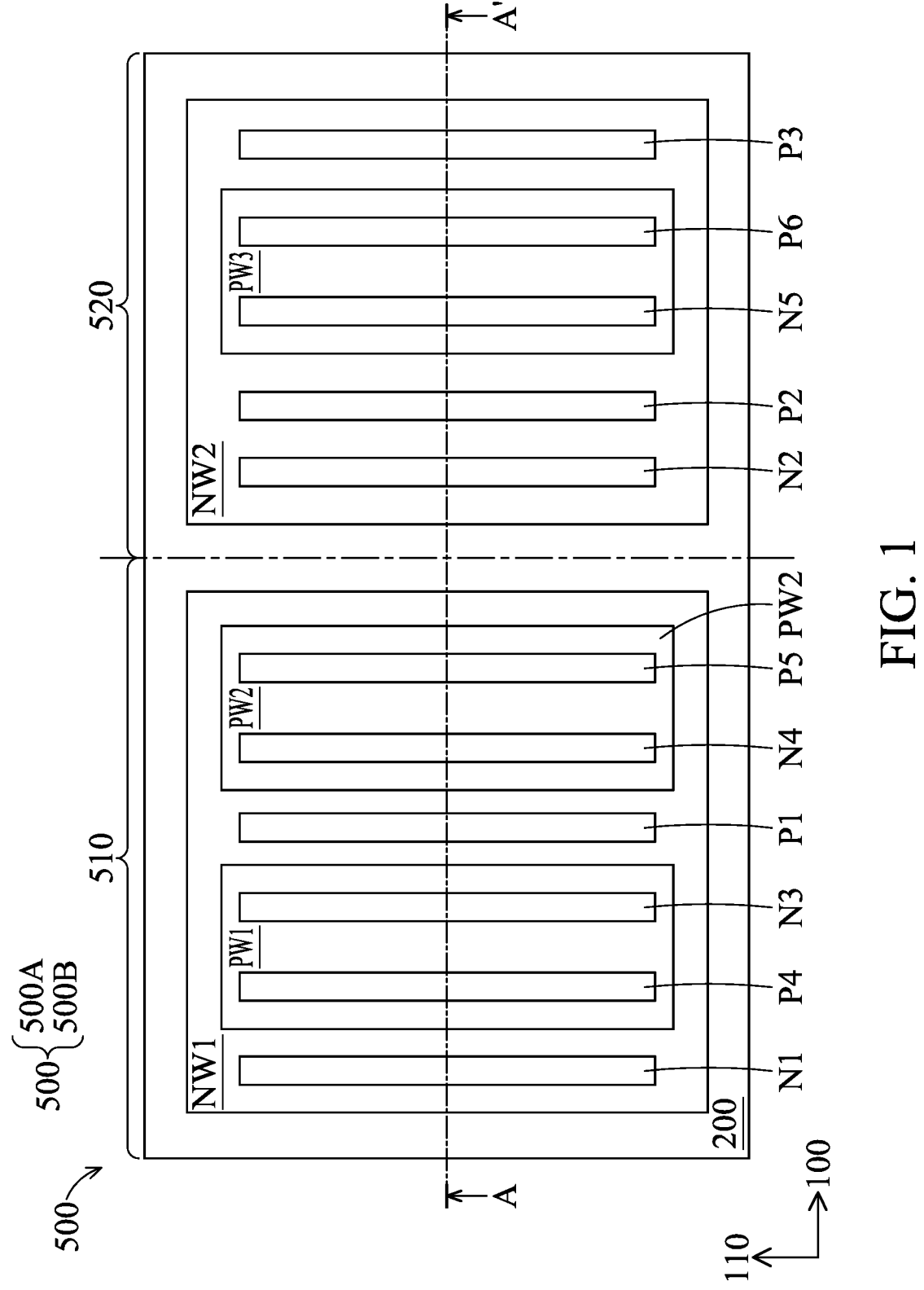
FIG. 1 is a schematic top view of an electrostatic discharge protection device in accordance with some embodiments of the disclosure.
Figure 2B:
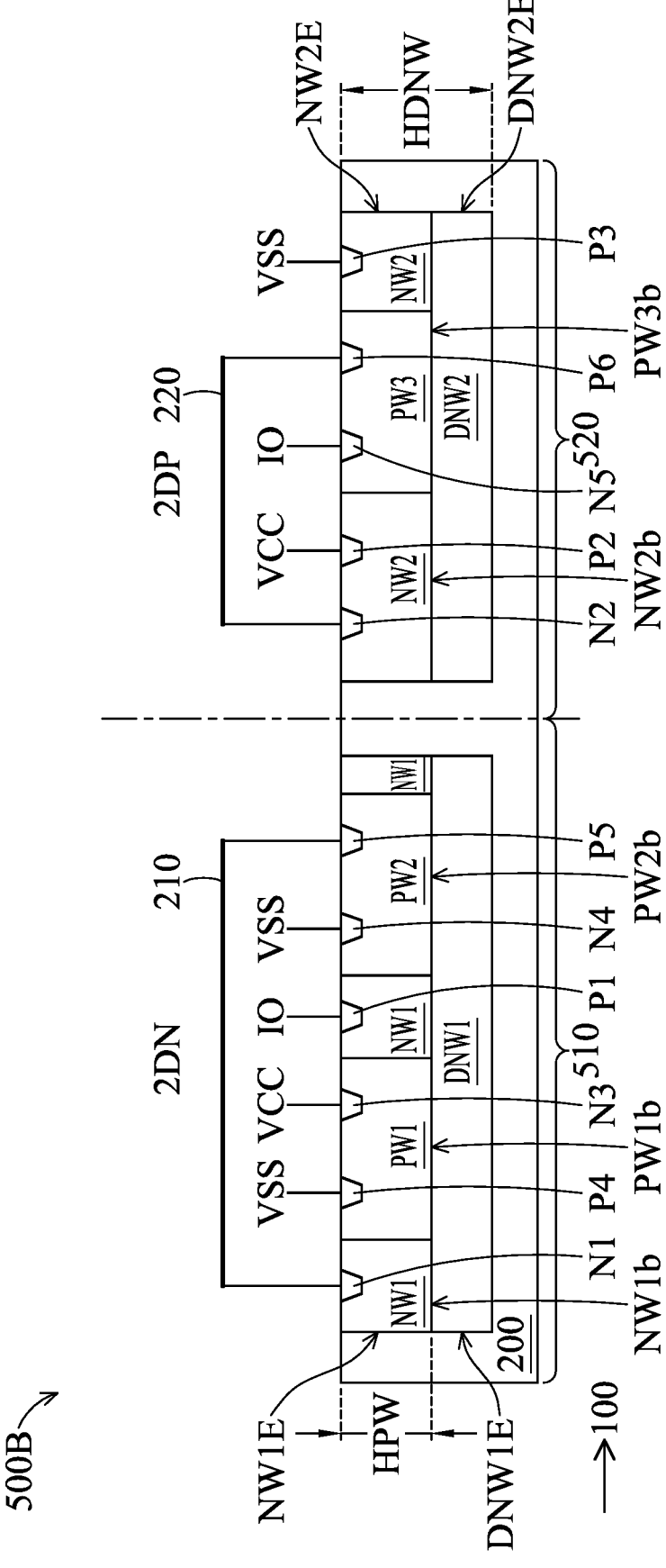
FIG. 2B is a schematic cross-sectional view along the line A-A' of the electrostatic discharge protection device of FIG. 1 in accordance with some embodiments of the disclosure.

FIG. 1 is a schematic top view of an electrostatic discharge (ESD) protection device 500 (including ESD protection devices 500A and 500B) in accordance with some embodiments of the disclosure. FIG. 2 is a schematic cross-sectional view along the line A-A' of the ESD protection device 500A of FIG. 1 in accordance with some embodiments of the disclosure. The ESD protection device 500 is electrically connected between the input/output terminal (IO), the ground terminal (VSS) and the power supply terminal (VCC) of the system to prevent an electrostatic discharge current from flowing through the circuit under protection. Moreover, the ESD protection device 500 in accordance with some embodiments of the disclosure is suitable for the system with an operating voltage of less than 1.0 V (the voltage difference between the high-level (voltage level) terminal and the low-level terminal in the system is less than 1.0 V). The ESD protection device 500A includes a P-type semiconductor substrate 200, and a first N-type well region NW1, a second N-type well region NW2, a first P-type well region PW1, a second P-type well region PW2 and a third P-type well region PW3 located in the P-type semiconductor substrate 200. The first N-type well region NW1, the second N-type well region NW2, the first P-type well region PW1, the second P-type well region PW2 and the third P-type well region PW3 respectively include at least one pair of heavily doped regions of opposite conductivity types. In addition, the number of P-type heavily doped regions in the second N-type well region NW2 is greater by one than the number of the N-type heavily doped regions in the second N-type well region NW2. For example, the first N-type well region NW1 includes a first N-type doped region N1 and a first P-type doped region P1 disposed in the first N-type well region NW1. The second N-type well region NW2 includes a second N-type doped region N2, a second P-type type doped region P2 and a third P-type doped region P3 disposed in the second N-type well region NW2. The first P-type well region PW1 includes a third N-type doped region N3 and a fourth P-type doped region P4 disposed in the first P-type well region PW1. The second P-type well region PW2 includes a fourth N-type doped region N4 and a fifth P-type doped region P5 disposed in second P-type well region PW2. The third P-type well region PW3 includes a fifth N-type doped region N5 and a sixth P-type doped region P6 disposed in the third P-type well region PW3. FIG. 1 only shows the above features for illustration, and other features may be shown in the cross-sectional schematic view of FIGS. 2A and 2B, which are taken along the line A-A' of FIG. 1, and the line A-A' is substantially parallel to a direction 100

As shown in FIGS. 1 and 2A, the first N-type well region NW1 and the second N-type well region NW2 are located in adjacent regions 510 and 520 of the P-type semiconductor substrate 200. The first N-type well region NW1 and the second N-type well region NW2 both are arranged side-by-side along the direction 100 and spaced apart from each other. The first N-type doped region N1 and the first P-type doped region P1 located in the first N-type well region NW1 both extend along a direction 110 (for example, the first N-type doped region N1 and the first P-type doped region P1 are strip-shaped). In addition, the first N-type doped region N1 and the first P-type doped region P1 are arranged side-by-side along the direction 100 and spaced apart from each other. In this embodiment, the first N-type doped region N1 is located in a peripheral region of the first N-type well region NW1 away from the second N-type well region NW2. The first P-type doped region P1 is disposed in a central region close to the first N-well area NW1. However, the relative position between the first N-type doped region N1 and the first P-type doped region P1 is not limited to the disclosed embodiments.

As shown in FIGS. 1 and 2A, the second N-type doped region N2, the second P-type doped region P2 and the third P-type doped region P3 located in the second N-type well region NW2 all extend along the direction 110 (e.g. the second N-type doped region N2, the second P-type doped region P2 and the third P-type doped region P3 are strip-shaped). The second N-type doped region N2, the second P-type doped region P2 and the third P-type doped region P3 are arranged side-by-side along the direction 100 and spaced apart from each other. In detail, the second N-type doped region N2 and the second P-type doped region P2 are located in a peripheral region of the second N-type well region NW2 close to the first N-type well region NW1. The third P-type doped region P3 is located in the peripheral region of the second N-type well region NW2 away from the first N-type well region NW1. In addition, the second N-type doped region N2 and the third P-type doped region P3 are respectively located on opposite sides of the second P-type doped region P2 substantially parallel to the direction 110, and are respectively disposed spaced apart from the second P-type doped region P2 along the direction 100.

As shown in FIGS. 1 and 2A, the first P-type well region PW1 and the second P-type well region PW2 of the ESD protection device 500A are both located in the first N-type well region NW1. The first P-type well region PW1 and the second P-type well region PW2 both extend along the direction 110 and are arranged side-by-side along the direction 100. In the top view shown in FIG. 1, both the first P-type well region PW1 and the second P-type well region PW2 are surrounded by the first N-type well region NW1. In the cross-sectional view shown in FIG. 2, a depth HNW of the first N-type well NW1 is greater than a depth HPW of the first P-type well PW1 and the second P-type well PW2. In some embodiments, the first P-type well region PW1 is located between the first N-type doped region N1 and the first P-type doped region P1 along the direction 100. The second P-type well PW2 is located in the peripheral region of the first N-type well NW1 close to the second N-type well NW2. Moreover, the first P-type well region PW1 and the second P-type well region PW2 are respectively located on opposite sides of the first P-type doped region P1 substantially parallel to the direction 110, and are respectively disposed spaced apart from the first P-type doped region P1 along the direction 100.

As shown in FIGS. 1 and 2A, the third N-type doped region N3 and the fourth P-type doped region P4 located in the first P-type well region PW1 both extend along the direction 110 (for example, the third N-type doped region N3 and the fourth P-type doped region P4 are strip-shaped). The third N-type doped region N3 and the fourth P-type doped region P4 are arranged side-by-side along the direction 100 and spaced apart from each other. In detail, the third N-type doped region N3 is located between the first P-type doped region P1 and the fourth P-type doped region P4 along the direction 100. The fourth P-type doped region P4 is located between the first N-type doped region N1 and the third N-type doped region N3 along the direction 100.

As shown in FIGS. 1 and 2A, the fourth N-type doped region N4 and the fifth P-type doped region P5 located in the second P-type well region PW2 both extend along the direction 110 (for example, the fourth N-type doped region N4 and the fifth P-type doped region P5 are strip-shaped). The fourth N-type doped region N4 and the fifth P-type doped region P5 are arranged side-by-side along the direction 100 and spaced apart from each other. In detail, the fourth N-type doped region N4 is located between the first P-type doped region P1 and the fifth P-type doped region P5 along the direction 100.

As shown in FIGS. 1 and 2A, the third P-type well region PW3 of the ESD protection device 500A is located in the second N-type well region NW2 and extends along the direction 110. In some embodiments, the second P-type doped region P2 and the third P-type doped region P3 are respectively located on opposite sides of the third P-type well region PW3 substantially parallel to the direction 110, and are respectively disposed spaced apart from the third P-type well region PW3 along the direction 100.

As shown in FIGS. 1 and 2A, the fifth N-type doped region N5 and the sixth P-type doped region P6 located in the third P-type well region PW3 both extend along the direction 110 (for example, the fifth N-type doped region N5 and the sixth P-type doped region P6 are strip-shape). The fifth N-type doped region N5 and the sixth P-type doped region P6 are arranged side-by-side along the direction 100 and spaced apart from each other. In detail, the fifth N-type doped region N5 is located between the second P-type doped region P2 and the sixth P-type doped region P6 along the direction 100. The sixth P-type doped region P6 is located between the fifth N-type doped region N5 and the third P-type doped region P3 along the direction 100.

As shown in FIG. 2A, in some embodiments, the first N-type doped region N1 in the first N-type well region NW1 is directly electrically connected to the fifth P-type doped region P5 in the second P-type well region PW2 using a conductive line 210. In addition, the first P-type doped region P1 in the first N-type well region NW1 is electrically connected to the input/output terminal IO. The third N-type doped region N3 in the first P-type well region PW1 is electrically connected to the power supply terminal VCC. The fourth N-type doped region N4 in the second P-type well region PW2 and the fourth P-type doped region P4 in the first P-type well region PW1 are electrically connected to the ground terminal VSS. In some embodiments, the second N-type doped region N2 in the second N-type well region NW2 is directly electrically connected to the sixth P-type doped region P6 in the third P-type well region PW3 using a conductive line 220. The second P-type doped region P2 in the second N-type well region NW2 is electrically connected to the power supply terminal VCC. The third P-type doped region P3 in the second N-type well region NW2 is electrically connected to the ground terminal VSS.

The fifth N-type doped region N5 in the third P-type well region PW3 is electrically connected to the input/output terminal IO.

In some embodiments, the N-type well region and the P-type well region surrounded by the N-type well region may have the same depth. In addition, bottoms of the N-type well regions may be electrically connected to each other using an N-type deep well region (DNW). FIG. 2B is a schematic cross-sectional view along the line A-A' of the ESD protection device 500B of FIG. 1 in accordance with some embodiments of the disclosure. Compared with the ESD protection device 500A, the first N-type well region NW1, the second N-type well region NW2, the first P-type well region PW1, the second P-type well region PW2 and the third P-type well region PW3 of the ESD protection device 500B have the same depth HPW. Moreover, the ESD protection device 500B further includes a first N-type deep well region DNW1 and a second N-type deep well region DNW2. In some embodiments, the first N-type deep well region DNW1 is located below the first N-type well region NW1, the first P-type well region PW1 and the second P-type well region PW2. In some embodiments, a depth HDNW of the first N-type deep well region DNW1 is greater than the depth HPW of the first N-type well region NW1, the second N-type well region NW2, the first P-type well region PW1, the second P-type well region PW2 and the third P-type well region PW3. The first N-type deep well region DNW1 is in contact with bottom surfaces NW1b, PW1b, and PW2b of the first N-type well region NW1, the first P-type well region PW1 and the second P-type well region PW2. In the cross-sectional view shown in FIG. 2B, a boundary DNW1E of the first N-type deep well region DNW1 is aligned with a boundary NW1E of the first N-type well region NW1.

As shown in FIG. 2B, the second N-type deep well region DNW2 of the electrostatic discharge protection device 500B is located below the second N-type well region NW2 and the third P-type well region PW3. In addition, the second N-type deep well region DNW2 is spaced apart from the first N-type deep well region DNW1. In some embodiments, the first N-type deep well region DNW1 and the second N-type deep well region DNW2 have the same depth HDNW. The second N-type deep well region DNW2 is in contact with bottom surfaces NW2b and PW3b of the second N-type well region NW2 and the third P-type well region PW3. In the cross-sectional view shown in FIG. 2B, a boundary DNW2E of the second N-type deep well region DNW2 is aligned with a boundary NW2E of the second N-type well region NW2.

Next, the ESD protection device 500A is used to describe the equivalent circuit diagram and the discharge current path triggered by each electrostatic discharge event occurring at the input/output terminal IO, the power supply terminal VCC or the ground terminal VSS. In some embodiments, the equivalent circuit diagram and the current discharge path between the different terminals of the ESD protection device 500B triggered by the aforementioned ESD events are the same as those of the ESD protection device 500A, and the details are not repeated herein.

Figure 3B:
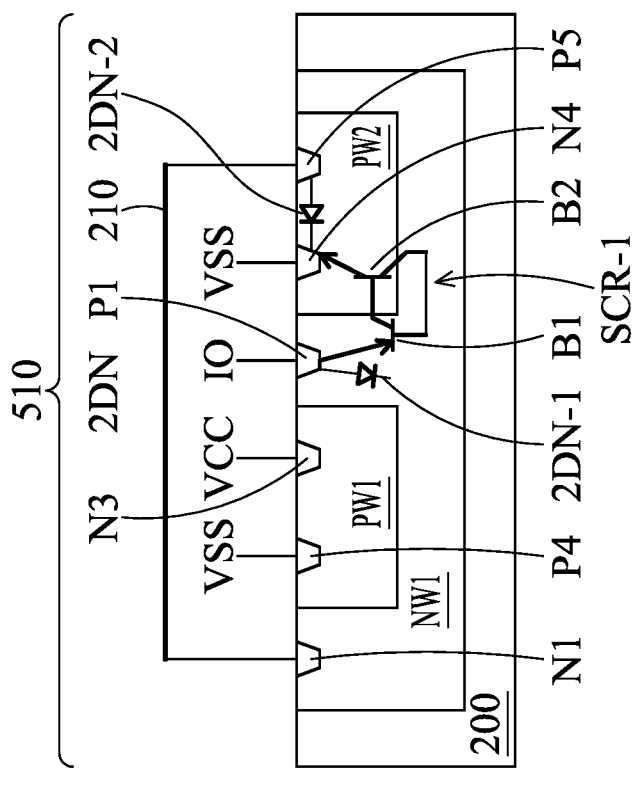
FIG. 3B is a partial enlarged view of FIG. 2A showing the parasitic elements of the equivalent discharge circuit of FIG. 3A at the corresponding positions of the electrostatic discharge protection device of FIG. 2A.
Figure 3A:
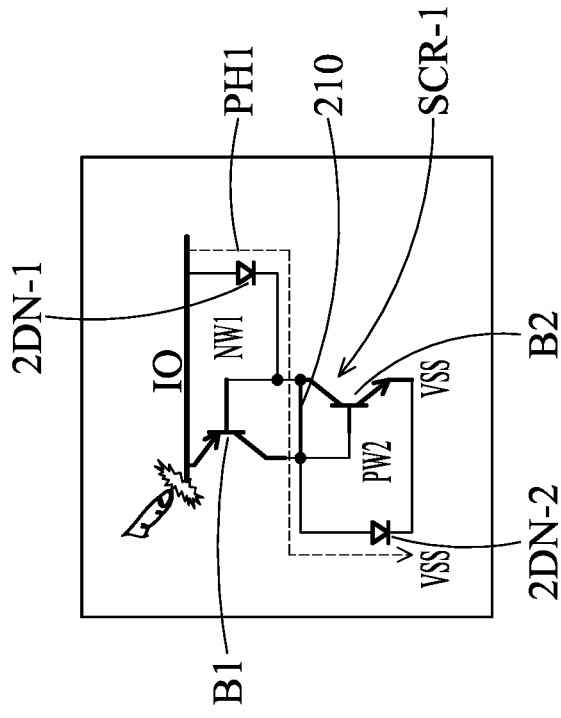
FIG. 3A is an equivalent discharge circuit diagram of the electrostatic discharge protection device when an electrostatic discharge event occurs between an input/output terminal (IO) and a ground terminal (VSS)

FIG. 3A shows an equivalent discharge circuit diagram of the ESD protection device 500 when an ESD event occurs between the input/output terminal IO and the ground terminal VSS. FIG. 3B is an enlarged view of the region 510 of FIG. 2A showing the parasitic elements of the equivalent discharge circuit of FIG. 3A at the corresponding positions of the ESD protection device 500A of FIG. 2A. As shown in FIGS. 3A and 3B, the equivalent discharge circuit in a condition that the ESD event occurs between the input/ output terminal IO and the ground terminal VSS includes a first parasitic diode 2DN-1 and the second parasitic diode 2DN-2. The first parasitic diode 2DN-1 is formed by the first P-type doped region P1 and the first N-type well region NW1. The second parasitic diode 2DN-2 is formed by the fifth P-type doped region P5, the second P-type well region PW2 and the fourth N-type doped region N4. The first parasitic diode 2DN-1 and the second parasitic diode 2DN-2 are connected in series and annotated as two serially connected parasitic diodes 2DN. The equivalent circuit also includes a first parasitic bipolar junction transistor (BJT) B1 (such as a parasitic PNP BJT) formed by the first P-type doped region P1, the first N-type well region NW1 and the second P-type well region PW2. Emitter, base and collector of the first parasitic bipolar junction transistor B1 are respectively formed by the first P-type doped region P1, the first N-type well region NW1 and the second P-type well region PW2. In addition, the equivalent circuit further includes a second parasitic bipolar junction transistor B2 (such as a parasitic NPN BJT) formed by the fourth N-type doped region N4, the second P-type well region PW2 and the first N-type well region NW1. Emitter, base and collector of the second parasitic bipolar junction transistor B2 are respectively formed by the fourth N-type doped region N4, the second P-type well region PW2 and the first N-type well region NW1. Moreover, the base (the first N-type well region NW1) of the first parasitic bipolar junction transistor B1 is electrically connected to the collector (the first N-type well region NW1) of the second parasitic bipolar junction transistor B2 (the base of the first parasitic bipolar junction transistor B1 is common used as the collector of the second parasitic bipolar junction transistor B2), and the base (the second P-type well region PW2) of the second parasitic bipolar junction transistor B2 is electrically connected to the collector (the second P-type well region PW2) of the first parasitic bipolar junction transistor B1 to form a first parasitic semiconductor controlled rectifier SCR-1. Furthermore, the base (the first N-type well region NW1) of the first parasitic bipolar junction transistor B1 is electrically connected to a cathode of the first parasitic diode 2DN-1. The base (the second P-type well region PW2) of the second parasitic bipolar junction transistor B2 is electrically connected to an anode of the second parasitic diode 2DN-2.

When an electrostatic discharge (ESD) event occurs between the input/output terminal IO and the ground terminal VSS, the high current pulse received by the input/output terminal IO may apply a forward bias to the first parasitic diode 2DN-1 and the second parasitic diode 2DN-1 connected in series through the conductive line 210 to trigger the first parasitic diode 2DN-1 and the second parasitic diode 2DN-1 to turn on (in a slight conduction state), so as to form a current path PH1 flowing from the input/output terminal IO through the first parasitic diode 2DN-1, the conductive line 210 and the second parasitic diode 2DN-2 and to the ground terminal VSS (the end of the electrostatic discharge event, or the receiving terminal of the electrostatic discharge current). The current path PH1 allows a little (a portion of) electrostatic discharge current flowing through. Since the first parasitic diode 2DN-1 is also the parasitic diode formed by the emitter (the first P-type doped region P1)-base (the first N-type well region NW1) junction of the first parasitic bipolar junction transistor B1. The second parasitic diode 2DN-2 is also the parasitic diode formed by the base (the second P-type well region PW2)-emitter (the fourth N-type doped region N4) junction of the second parasitic bipolar junction transistor B2. When the first parasitic diode 2DN-1 and the second parasitic diode 2DN-2 (the two serially connected parasitic diodes 2DN) slightly turn on, the first parasitic bipolar junction transistor B1 and the second parasitic bipolar junction transistors B2 are triggered to ON together, and the high-efficiency first parasitic semiconductor-controlled rectifier SCR-1 is accordingly triggered to ON. Most of the electrostatic charges are discharged from the input/output terminal IO to the ground terminal VSS to prevent the electrostatic discharge current from flowing through the circuit under protection.

Figure 4B:
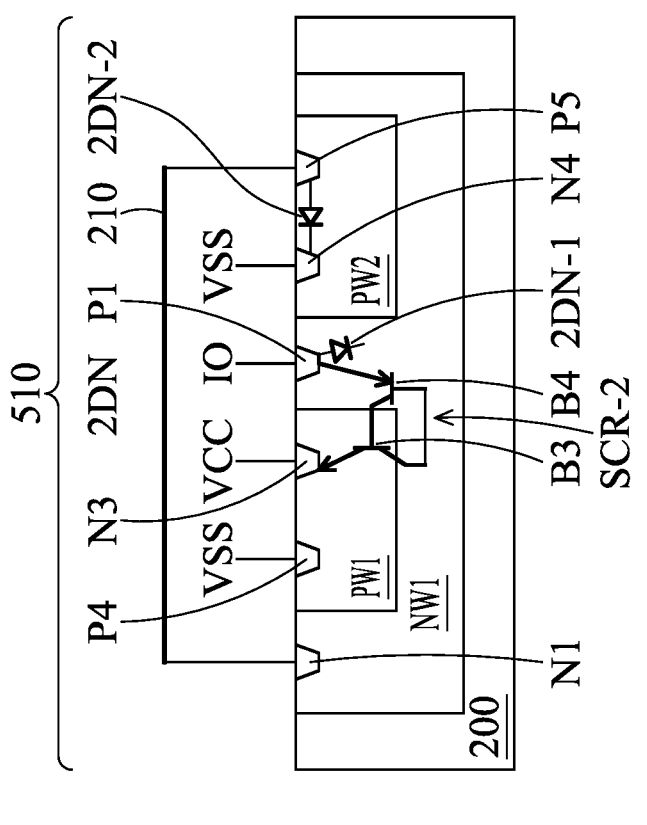
FIG. 4B is a partial enlarged view of FIG. 2A showing the parasitic elements of the equivalent discharge circuit of FIG. 4A at the corresponding positions of the electrostatic discharge protection device of FIG. 2A.
Figure 4A:
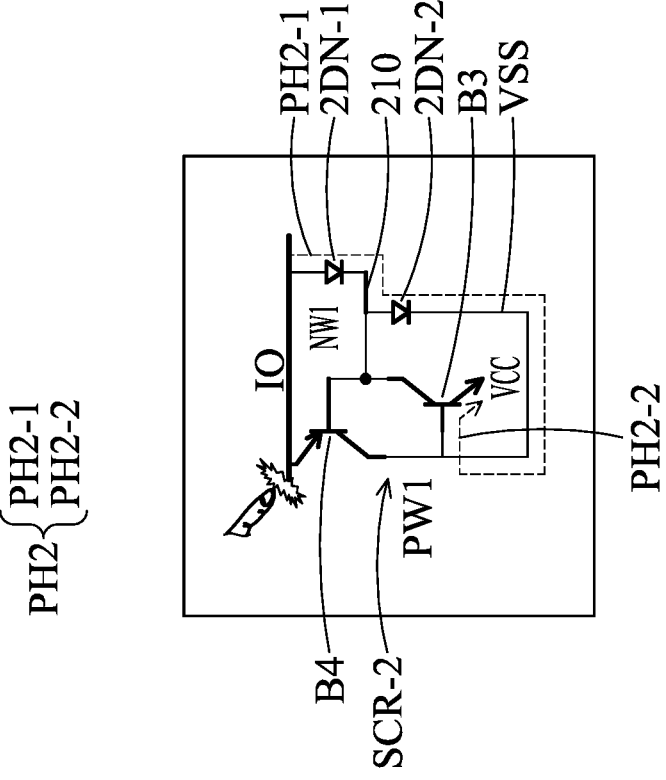
FIG. 4A illustrates another equivalent discharge circuit diagram of the electrostatic discharge protection device when an electrostatic discharge event occurs between the input/output terminal (IO) and a power supply terminal (VCC)

FIG. 4A illustrates another equivalent discharge circuit diagram of the ESD protection device 500 when an electrostatic discharge event occurs between the input/output terminal IO and the power supply terminal VCC. FIG. 4B is a partial enlarged view of FIG. 2A showing the parasitic elements of the equivalent discharge circuit of FIG. 4A at the corresponding positions of the ESD protection device 500A of FIG. 2A. As shown in FIGS. 4A and 4B, the first parasitic diode 2DN-1 and the second parasitic diode 2DN-2 are connected in series and also annotated as the two serially connected parasitic diodes 2DN. The equivalent circuit further includes a third parasitic bipolar junction transistor B3 (such as a parasitic NPN BJT) formed by the third N-type doped region N3, the first P-type well region PW1 and the first N-type well region NW1. Emitter, base and collector of the third parasitic bipolar junction transistor B3 are respectively formed by the third N-type doped region N3, the first P-type well region PW1 and the first N-type well region NW1. The equivalent circuit further includes a fourth parasitic bipolar junction transistor B4 (such as a parasitic PNP BJT) formed by the first P-type doped region P1, the first N-type well region NW1 and the first P-type well region PW1. Emitter, base and collector of the fourth parasitic bipolar junction transistor B4 are respectively formed by the first P-type doped region P1, the first N-type well region NW1 and the first P-type well region PW1. Moreover, the base (the first P-type well region PW1) of the third parasitic bipolar junction transistor B3 is electrically connected to the collector (the first P-type well region PW1) of the fourth parasitic bipolar junction transistor B4 (the base of the third parasitic bipolar junction transistor B3 is common used as the collector of the fourth parasitic bipolar junction transistor B4), and the base (the first N-type well region NW1) of the fourth parasitic bipolar junction transistor B4 is electrically connected to the collector (the first N-type well region NW1) of the third parasitic bipolar junction transistor B3 to form a second parasitic semiconductor controlled rectifier SCR-2. In addition, the base (the first N-type well region NW1) of the fourth parasitic bipolar junction transistor B4 is electrically connected to a cathode of the first parasitic diode 2DN-1 and an anode of the second parasitic diode 2DN-2 using the conductive line 210.

When an ESD event occurs between the input/output terminal IO and the power supply terminal VCC, the high current pulse received by the input/output terminal IO may apply a forward bias to the first parasitic diode 2DN-1 and second parasitic diode 2DN-2 connected in series through the conductive line 210 to trigger the first parasitic diode 2DN-1 and second parasitic diode 2DN-2 to turn on (in a slight conduction state), so as to form a current path PH2-1 flowing from the input/output terminal IO, through the first parasitic diode 2DN-1, the conductive line 210 and the second parasitic diode 2DN-2 and to the ground terminal VSS. Because the slight conduction current (on-current) flowing through the first parasitic diode 2DN-1 and the second parasitic diode 2DN-2 connected in series (e.g., the two serially connected parasitic diodes 2DN) may flow to the base of the third parasitic bipolar junction transistor B3 through the common conductive line 210 that is also electrically connected to the ground terminal VSS. Therefore, a current path PH2-2 flowing through the base (the first P-type well region PW1)-emitter (the third N-type doped region N3) junction of the third parasitic bipolar junction transistor B3 and to the power supply terminal VCC (the end of the electrostatic discharge event, or the receiving terminal of the electrostatic discharge current). The current paths PH2-1 and PH2-2 form a current path PH2 from the input/output terminal IO to the power supply terminal VCC. The current path PH2 may allow a little (a portion of) electrostatic discharge current to flow through. When the first parasitic diode 2DN-1 and the second parasitic diode 2DN-2 (i.e., the two serially connected parasitic diodes 2DN) slightly turn on, the base (the first P-type well region PW1)-emitter (the third N-type doped region N3) junction of the third parasitic bipolar junction transistor B3 and the emitter (the first P-type doped region P1)-base (the first N-type well region NW1) junction of the fourth parasitic bipolar junction transistor B4 are forward biased simultaneously to trigger both the third parasitic bipolar junction transistor B3 and the fourth parasitic bipolar junction transistor B4 to turn on, and the high-efficiency second parasitic semiconductor-controlled rectifier SCR-2 is accordingly triggered to ON. Most of the electrostatic charges are discharged from the input/output terminal IO to the power supply terminal VCC to prevent the electrostatic discharge current from flowing through the circuit under protection.

Figure 5B:
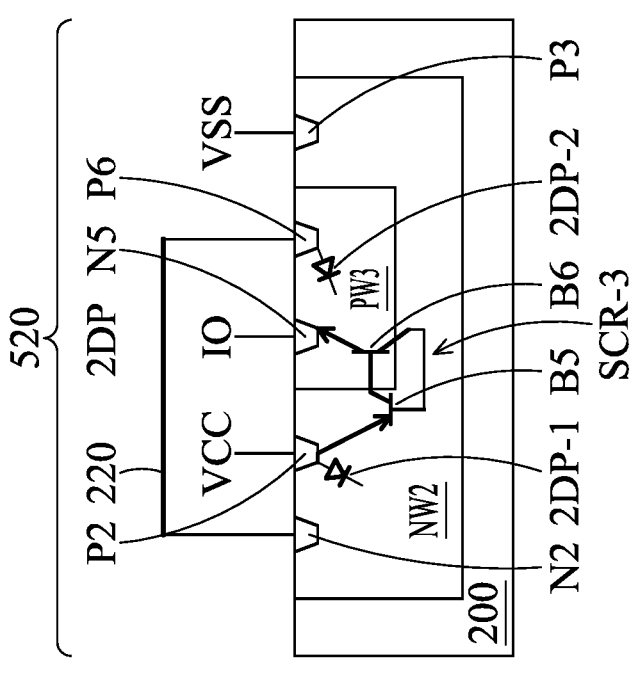
FIG. 5B is a partial enlarged view of FIG. 2A showing the parasitic elements of the equivalent discharge circuit of FIG.
Figure 5A:
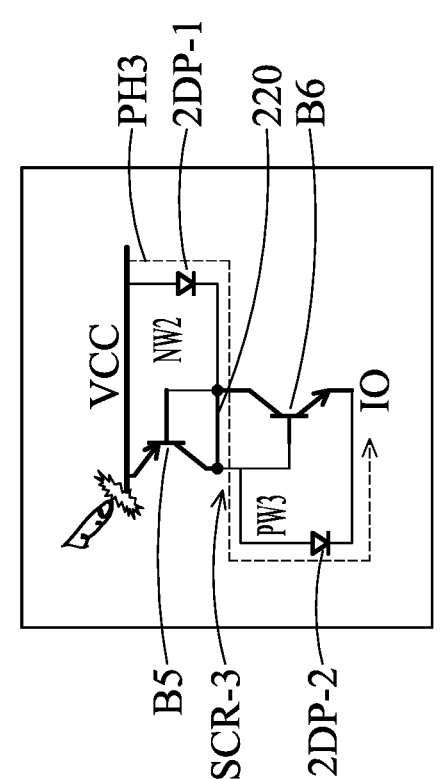
FIG. 5A is an equivalent discharge circuit diagram of the electrostatic discharge protection device when an electrostatic discharge event occurs between the power supply terminal (VCC) and the input/output terminal (IO)

FIG. 5A is an equivalent discharge circuit diagram of the ESD protection device 500 when an electrostatic discharge event occurs between the power supply terminal VCC and the input/output terminal IO. FIG. 5B is a partial enlarged view of FIG. 2A showing the parasitic elements of the equivalent discharge circuit of FIG. 5A at the corresponding positions of the ESD protection device 500A of FIG. 2A. As shown in FIGS. 5A and 5B, the equivalent discharge circuit in a condition that the electrostatic discharge event occurs between the power supply terminal VCC and the input/output terminal IO includes a fourth parasitic diode 2DP-1 and a fifth parasitic diode 2DP-2. The fourth parasitic diode 2DP-1 is formed by a second P-type doped region P2 and a second N-type well region NW2. The fifth parasitic diode 2DP-2 is formed by the sixth P-type doped region P6, the third P-type well region PW3 and the fifth N-type doped region N5. The fourth parasitic diode 2DP-1 and the fifth parasitic diode 2DP-2 are connected in series and annotated as two serially connected parasitic diodes 2DP. The equivalent circuit further includes a fifth parasitic bipolar junction transistor B5 (such as a parasitic PNP BJT) formed by the second P-type doped region P2, the second N-type well region NW2 and the third P-type well region PW3. Emitter, base and collector of the fifth parasitic bipolar junction transistor B5 are respectively formed by the second P-type doped region P2, the second N-type well region NW2 and the third P-type well region PW3. The equivalent circuit further includes a sixth parasitic bipolar junction transistor B6 (such as a parasitic NPN BJT) formed by the fifth N-type doped region N5, the third P-type well region PW3 and the second N-type well region NW2. Emitter, base and collector of the sixth parasitic bipolar junction transistor B6 are respectively formed by the fifth N-type doped region N5, the third P-type well region PW3 and the second N-type well region NW2. Moreover, the base (the second N-type well region NW2) of the fifth parasitic bipolar junction transistor B5 is electrically connected to the collector (the second N-type well region NW2) of the sixth parasitic bipolar junction transistor B6. The base (the third P-type well region PW3) of the sixth parasitic bipolar junction transistor B6 is electrically connected to the collector (the third P-type well region PW3) of the fifth parasitic bipolar junction transistor B5 (the base of the sixth parasitic bipolar junction transistor B6 is common used as the collector of the fifth parasitic bipolar junction transistor B5) to form a third parasitic semiconductor controlled rectifier SCR-3. In addition, the base (the second N-type well region NW2) of the fifth parasitic bipolar junction transistor B5 is electrically connected to a cathode of the fourth parasitic diode 2DP-1. The base (the third P-type well region PW3) of the sixth parasitic bipolar junction transistor B6 is electrically connected to an anode of the fifth parasitic diode 2DP-2.

When an electrostatic discharge (ESD) event occurs between the power supply terminal VCC and the input/output terminal IO, the high current pulse received by the power supply terminal VCC may apply a forward bias to the fourth parasitic diode 2DP-1 and the fifth parasitic diode 2DP-2 connected in series through the conductive line 220 to trigger the fourth parasitic diode 2DP-1 and the fifth parasitic diode 2DP-2 to turn on (in a slight conduction state), so as to form a current path PH3 flowing from the power supply terminal VCC, through the fourth parasitic diode 2DP-1, the conductive line 220 and the fifth parasitic diode 2DP-2 and to the input/output terminal IO (receiving the low voltage level). The current path PH3 allows a little (a portion of) electrostatic discharge current to flow through. Since the fourth parasitic diode 2DP-1 is also a parasitic diode formed by the emitter (the second P-type doped region P2)-base (the second N-type well region NW2) junction of the fifth parasitic bipolar junction transistor B5. The fifth parasitic diode 2DP-2 is also a parasitic diode formed by the base (the third P-type well region PW3)-emitter (the fifth N-type doped region N5) junction of the sixth parasitic bipolar junction transistor B6. When the fourth parasitic diode 2DP-1 and the fifth parasitic diode 2DP-2 (i.e., the two serially connected parasitic diodes 2DP) slightly turn on, the fifth parasitic bipolar junction transistor B5 and the sixth parasitic bipolar junction transistor B6 are triggered to ON together, so that the third parasitic semiconductor control rectifier SCR-3 is triggered to ON. Most of the electrostatic charges are discharged from the power supply terminal VCC to the input/output terminal IO to prevent the electrostatic discharge current from flowing through the circuit under protection.

FIG. 6A is an equivalent discharge circuit diagram of the ESD protection device 500 when an electrostatic discharge event occurs between the ground terminal VSS and the input/output terminal IO. FIG. 6B is a partial enlarged view of FIG. 2A showing the parasitic elements of the equivalent discharge circuit of FIG. 6A at the corresponding positions of the ESD protection device 500A of FIG. 2A. As shown in FIGS. 6A and 6B, except for the fifth parasitic diode 2DP-2 and the sixth parasitic bipolar junction transistor B6 (such as a parasitic NPN BJT), the equivalent discharge circuit in a condition that the electrostatic discharge event occurs between the ground terminal VSS and the input/output terminals IO further includes a sixth parasitic diode 2DP-3 formed by the third P-type doped region P3 and the second N-type well region NW2. The fifth parasitic diode 2DP-2 and the sixth parasitic diode 2DP-3 are connected in series and also annotated as the two serially connected parasitic diodes 2DP. The equivalent circuit further includes a seventh parasitic bipolar junction transistor B7 (such as a parasitic PNP BJT) formed by the third P-type doped region P3, the second N-type well region NW2 and the third P-type well region PW3. Emitter, base and collector of the seventh parasitic bipolar junction transistor B7 are respectively formed by the third P-type doped region P3, the second N-type well region NW2 and the third P-type well region PW3. Moreover, the base (the third P-type well region PW3) of the sixth parasitic bipolar junction transistor B6 is electrically connected to the collector (the third P-type well region PW3) of the seventh parasitic bipolar junction transistor B7 (the base of the sixth parasitic bipolar junction transistor B6 is common used as the collector of the seventh parasitic bipolar junction transistor B7), and the base (the second N-type well region NW2) of the seventh parasitic bipolar junction transistor B7 is electrically connected to the collector (the second N-type well region NW2) of the sixth parasitic bipolar junction transistor B6 to form a fourth parasitic semiconductor controlled rectifier SCR-4. In addition, the base (the second N-type well region NW2) of the seventh parasitic bipolar junction transistor B7 is electrically connected to a cathode of the sixth parasitic diode 2DP-3. The base (the third P-type well region PW3) of the sixth parasitic bipolar junction transistor B6 is electrically connected to an anode of the fifth parasitic diode 2DP-2.

When an electrostatic discharge (ESD) event occurs between the ground terminal VSS and the input/output terminal IO, the high current pulse received by the ground terminal VSS may apply a forward bias to the sixth parasitic diode 2DP-3 and the fifth parasitic diode 2DP-2 connected in series through the conductive line 220 (i.e., the two serially connected parasitic diodes 2DP) to trigged the sixth parasitic diode 2DP-3 and the fifth parasitic diode 2DP-3 to turn on, so as to form a current path PH4 flowing from the ground terminal VSS 2DP-3, through the sixth parasitic diode 2DP-3, the conductive line 220 and the fifth parasitic diode 2DP-2 and to the input/output terminal IO (the end of the electrostatic discharge event, or the receiving terminal of the electrostatic discharge current). The current path PH4 may allow a little (a portion of) electrostatic discharge current to pass through. As mentioned above, the fifth parasitic diode 2DP-2 is also a parasitic diode formed by the base (the third P-type well region PW3)-emitter (the fifth N-type doped region N5) junction of the sixth parasitic bipolar junction transistor B6. Moreover, the sixth parasitic diode 2DP-3 is also a parasitic diode formed by the emitter (the third P-type doped region P3)-base (the second N-type well region NW2) junction of the seventh parasitic bipolar junction transistor B7. When the fifth parasitic diode 2DP-2 and the sixth parasitic diode 2DP-3 (i.e., the two serially connected parasitic diodes 2DP) slightly turn on, the sixth parasitic bipolar junction transistor B6 and the seventh parasitic bipolar junction transistor B7 are also triggered to ON, so that the fourth parasitic semiconductor controlled rectifier SCR-4 is triggered to ON. Most of the electrostatic charges are discharged from the ground terminal VSS to the input/output terminal IO to prevent the electrostatic discharge current from flowing through the circuit under protection.

Embodiments provide an ESD protection device, which can be applied to a system with an operating voltage of less than about 1.0 V. The ESD protection device is formed by arranging different P-type well regions in two N-type well regions and arranging the N-type/P-type heavily doped regions located in the N-type well regions and the P-type well regions in order to insert a parasitic semiconductor controlled rectifier (SCR) between the two serially connected parasitic diodes. Therefore, the base of the parasitic NPN BJT and the base of the PNP BJT in the parasitic semiconductor controlled rectifier are electrically connected to the cathode of the first parasitic diode and the anode of the second parasitic diode, respectively. In addition, the distance between the P-type heavily doped regions that are located in the two N-type well regions and receive a high voltage level and the corresponding N-type heavily doped regions that are located in the P-type well regions surrounded by the two N-type well regions and receives a low voltage level is reduced to the minimum spacing between the adjacent N-type and P-type heavily doped regions of the design rule (that is to say, in a cross-sectional view, there will be no other N-type doped region between the P-type heavily doped region that is located in the N-type well region and the N-type heavily doped region that is located in the P-type well region and surrounded by the N-type well region.) to shorten the distance between the anode (i.e., the first P-type doped region of the P-N-P-N junction) to the cathode (i.e., the last N-type doped region of the P-N-P-N junction) of the parasitic semiconductor controlled rectifier. The parasitic semiconductor controlled rectifier is a multi-directional semiconductor controlled rectifier, which can discharge electrostatic charges away from the circuit under protection when the electrostatic discharge event occurs at any two terminals of the input/output terminal IO, the power supply terminal VCC, or the ground terminal VSS. When the electrostatic discharge (ESD) event occurs, a portion of the electrostatic discharge current will first flow through the two serially connected parasitic diodes and to the low-level terminal, and quickly trigger the parasitic semiconductor controlled rectifier to turn on. Therefore, most of the electrostatic discharge current will discharge from the high-level terminal to the low-level terminal to prevent the electrostatic discharge current from flowing through the circuit under protection. The ESD protection device in accordance with some embodiments of the disclosure can significantly improve the discharge efficiency, and can provide the electrical parameters of the ESD protection device such as the extremely low trigger voltage ($V_{t1}$), extremely low holding voltage ($V_{Hold}$) and extremely low on resistance ($R_{on}$), thereby meeting the requirements of high-end manufacturing chips.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrostatic discharge protection device, comprising:

a P-type semiconductor substrate;

a first N-type well region located in the P-type semiconductor substrate;

a first N-type doped region located in the first N-type well region;

a first P-type doped region located in the first N-type well region, wherein the first P-type doped region and the first N-type doped region are arranged side-by-side and spaced apart from each other;

a second N-type well region located in the P-type semiconductor substrate, wherein the first N-type well region and the second N-type well region are arranged side-by-side and spaced apart from each other;

a second N-type doped region located in the second N-type well region;

a second P-type doped region located in and in contact with the second N-type well region;

a third P-type doped region located in and in contact with the second N-type well region, wherein the second N-type doped region, the second P-type doped region and the third P-type doped region are arranged side-by-side and spaced apart from one another;

a first P-type well region located in the first N-type well region;

a third N-type doped region located in the first P-type well region;

a fourth P-type doped region located in the first P-type well region, wherein the third N-type doped region and the fourth P-type doped region are arranged side-by-side and spaced apart from each other;

a second P-type well region located in the first N-type well region, wherein the first P-type well region and the second P-type well region are arranged side-by-side and spaced apart from each other, and the first P-type well region and the second P-type well region are surrounded by the first N-type well region;

a fourth N-type doped region located in the second P-type well region;

a fifth P-type doped region located in the second P-type well region, wherein the fourth N-type doped region and the fifth P-type doped region are arranged side-by-side and spaced apart from each other;

a third P-type well region located in the second N-type well region;

a fifth N-type doped region located in the third P-type well region; and a sixth P-type doped region located in the third P-type well region, wherein the fifth N-type doped region and the sixth P-type doped region are arranged side-by-side and spaced apart from each other;

wherein the first N-type doped region is directly electrically connected to the fifth P-type doped region, wherein the second N-type doped region is directly electrically connected to the sixth P-type doped region, wherein the first P-type doped region and the fifth N-type doped region are electrically connected to an input/output terminal, wherein the second P-type doped region and the third N-type doped region are electrically connected to a power supply terminal, and wherein the third P-type doped region, the fourth N-type doped region and the fourth P-type doped region are electrically connected to a ground terminal.

2. The electrostatic discharge protection device as claimed in claim 1, wherein the first N-type well region and the second N-type well region are arranged side-by-side along a first direction and spaced apart from each other.

3. The electrostatic discharge protection device as claimed in claim 2, wherein the first P-type well region is located between the first N-type doped region and the first P-type doped region along the first direction.

4. The electrostatic discharge protection device as claimed in claim 2, wherein the first P-type well region and the second P-type well region are respectively located on opposite sides of the first P-type doped region substantially parallel to a second direction, and wherein the first P-type well region and the second P-type well region are spaced apart from the first P-type doped region along the first direction.

5. The electrostatic discharge protection device as claimed in claim 2, wherein the second P-type doped region and the third P-type doped region are respectively located on opposite sides of the third P-type well region substantially parallel to a second direction, and wherein the second P-type doped region and the third P-type doped region are spaced apart from the third P-type well region along the first direction.

6. The electrostatic discharge protection device as claimed in claim 1, wherein in a cross-sectional view, the first N-type well region and the second N-type well region have a first depth, the first P-type well region, the second P-type well region and the third P-type well region have a second depth, and wherein the first depth is greater than the second depth.

7. The electrostatic discharge protection device as claimed in claim 1, further comprising:

a first N-type deep well region located below the first N-type well region, the first P-type well region and the second P-type well region, wherein the first N-type deep well region is in contact with bottom surfaces of the first N-type well region, the first P-type well region and the second P-type well region.

8. The electrostatic discharge protection device as claimed in claim 7, wherein in a cross-sectional view, a boundary of the first N-type deep well region is aligned with a boundary of the first N-type well region.

9. The electrostatic discharge protection device as claimed in claim 7, further comprising:

a second N-type deep well region located below the first N-type well region and the third P-type well region and spaced apart from the first N-type deep well region, wherein the second N-type deep well region is in contact with bottom surfaces of the first N-type well region and the third P-type well region.

10. The electrostatic discharge protection device as claimed in claim 9, wherein in a cross-sectional view, a boundary of the second N-type deep well region is aligned with a boundary of the second N-type well region.

11. The electrostatic discharge protection device as claimed in claim 9, wherein in a cross-sectional view, the first N-type well region and the second N-type well region have a first depth, the first P-type well region, the second P-type well region and the third P-type well region have a second depth, and wherein the first depth is equal to the second depth.

12. The electrostatic discharge protection device as claimed in claim 11, wherein in the cross-sectional view, the first N-type deep well region and the second N-type deep well region have a third depth, and wherein the third depth is greater than the first depth and the second depth.

13. The electrostatic discharge protection device as claimed in claim 1, wherein:

the first P-type doped region and the first N-type well region form a first parasitic diode, the fifth P-type doped region, the second P-type well region and the fourth N-type doped region form a second parasitic diode, wherein the first parasitic diode and the second parasitic diode are connected in series, the first P-type doped region, the first N-type well region and the second P-type well region form a first parasitic bipolar junction transistor, the fourth N-type doped region, the second P-type well region and the first N-type well region form a second parasitic bipolar junction transistor, a base of the first parasitic bipolar junction transistor is electrically connected to a collector of the second parasitic bipolar junction transistor, and a base of the second parasitic bipolar junction transistor is electrically connected to a collector of the first parasitic bipolar junction transistor to form a first parasitic semiconductor controlled rectifier, the base of the first parasitic bipolar junction transistor is electrically connected to a cathode of the first parasitic diode, and the base of the second parasitic bipolar junction transistor is electrically connected to an anode of the second parasitic diode.

14. The electrostatic discharge protection device as claimed in claim 13, wherein when an electrostatic discharge event occurs between the input/output terminal and the ground terminal, the first parasitic diode and the second parasitic diode are triggered to ON, and the first parasitic bipolar junction transistor and the second parasitic bipolar junction transistor are triggered to ON, and the first parasitic semiconductor controlled rectifier is accordingly triggered to ON.

15. The electrostatic discharge protection device as claimed in claim 1, wherein:

the first P-type doped region and the first N-type well region form a first parasitic diode, the second P-type well region, the fifth P-type doped region and the fourth N-type doped region form a second parasitic diode, wherein the first parasitic diode and the second parasitic diode are connected in series, the third N-type doped region, the first P-type well region and the first N-type well region form a third parasitic bipolar junction transistor, the first P-type doped region, the first N-type well region and the first P-type well region form a fourth parasitic bipolar junction transistor, a base of the third parasitic bipolar junction transistor is electrically connected to a collector of the fourth parasitic bipolar junction transistor, and a base of the fourth parasitic bipolar junction transistor is electrically connected to a collector of third parasitic bipolar junction transistor to form a second parasitic semiconductor controlled rectifier, and the base of the fourth parasitic bipolar junction transistor is electrically connected to a cathode of the first parasitic diode, and is electrically connected to an anode of the second parasitic diode through a conductive line.

16. The electrostatic discharge protection device as claimed in claim 15, wherein when an electrostatic discharge event occurs between the input/output terminal and the power supply terminal, the first parasitic diode and the second parasitic diode are triggered to ON, and the third parasitic bipolar junction transistor and the fourth parasitic bipolar junction transistor are triggered to ON, and the second parasitic semiconductor controlled rectifier is accordingly triggered to ON.

17. The electrostatic discharge protection device as claimed in claim 1, wherein:

the second P-type doped region and the second N-type well region form a fourth parasitic diode, the sixth P-type doped region, the third P-type well region and the fifth N-type doped region form a fifth parasitic diode, wherein the fourth parasitic diode and the fifth parasitic diode are connected in series, the second P-type doped region, the second N-type well region and the third P-type well region form a fifth parasitic bipolar junction transistor, the fifth N-type doped region, the third P-type well region and the second N-type well region form a sixth parasitic bipolar junction transistor, a base of the fifth parasitic bipolar junction transistor is electrically connected to a collector of the sixth parasitic bipolar junction transistor, and a base of the sixth parasitic bipolar junction transistor is electrically connected to a collector of the fifth parasitic bipolar junction transistor to form a third parasitic semiconductor controlled rectifier, the base of the fifth parasitic bipolar junction transistor is electrically connected to a cathode of the fourth parasitic diode, and the base of the sixth parasitic bipolar junction transistor is electrically connected to an anode of the fifth parasitic diode.

18. The electrostatic discharge protection device as claimed in claim 17, wherein when an electrostatic discharge event occurs between the power supply terminal and the input/output terminal, the fourth parasitic diode and the fifth parasitic diode are triggered to ON, and the fifth parasitic bipolar junction transistor and the sixth parasitic bipolar junction transistor are triggered to ON, and the third parasitic semiconductor controlled rectifier is accordingly triggered to ON.

19. The electrostatic discharge protection device as claimed in claim 1, wherein:

the sixth P-type doped region, the third P-type well region and the fifth N-type doped region form a fifth parasitic diode, the third P-type doped region and the second N-type well region form a sixth parasitic diode, wherein the fifth parasitic diode and the sixth parasitic diode are connected in series, the fifth N-type doped region, the third P-type well region and the second N-type well region form a sixth parasitic bipolar junction transistor, the third P-type doped region, the second N-type well region and the third P-type well region form a seventh parasitic bipolar junction transistor, a base of the sixth parasitic bipolar junction transistor is electrically connected to a collector of the seventh parasitic bipolar junction transistor, and a base of the seventh parasitic bipolar junction transistor is electrically connected a collector of sixth parasitic bipolar junction transistor to form a fourth parasitic semiconductor controlled rectifier, the base of the seventh parasitic bipolar junction transistor is electrically connected to a cathode of the sixth parasitic diode, and the base of the sixth parasitic bipolar junction transistor is electrically connected to an anode of the fifth parasitic diode.

20. The electrostatic discharge protection device as claimed in claim 19, wherein when an electrostatic discharge event occurs between the ground terminal and the input/output terminal, the fifth parasitic diode and the sixth parasitic diode are triggered to ON, and the sixth parasitic bipolar junction transistor and the seventh parasitic bipolar junction transistor are triggered to ON, and the fourth parasitic semiconductor controlled rectifier is accordingly triggered to ON.

* * * * *